US008867485B2

(12) United States Patent
Zhu

(10) Patent No.: US 8,867,485 B2
(45) Date of Patent: Oct. 21, 2014

(54) MULTIPLE LOCATION RETRIEVAL FUNCTION (LRF) NETWORK HAVING LOCATION CONTINUITY

(75) Inventor: Yinjun Zhu, Sammamish, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1034 days.

(21) Appl. No.: 12/585,347

(22) Filed: Sep. 11, 2009

(65) Prior Publication Data

US 2010/0284366 A1    Nov. 11, 2010

Related U.S. Application Data

(60) Provisional application No. 61/213,084, filed on May 5, 2009.

(51) Int. Cl.
| | |
|---|---|
| *H04W 4/00* | (2009.01) |
| *H04M 11/04* | (2006.01) |
| *H04W 36/00* | (2009.01) |
| *H04W 4/22* | (2009.01) |
| *H04W 76/00* | (2009.01) |

(52) U.S. Cl.
CPC ............ *H04W 36/0022* (2013.01); *H04W 4/22* (2013.01); *H04W 76/007* (2013.01)
USPC ....................... 370/331; 455/404.1; 455/404.2

(58) Field of Classification Search
USPC ........................................................ 370/331
See application file for complete search history.

(56) References Cited

U.S. PATENT DOCUMENTS

| | | | |
|---|---|---|---|
| 1,103,073 A | 7/1914 | O'Connell | |
| 4,494,119 A | 1/1985 | Wimbush | |
| 4,651,156 A | 3/1987 | Martinez | |
| 4,706,275 A | 11/1987 | Kamil | |
| 4,891,638 A | 1/1990 | Davis | |
| 4,891,650 A | 1/1990 | Sheffer | |

(Continued)

FOREIGN PATENT DOCUMENTS

| | | |
|---|---|---|
| WO | WO9921380 | 4/1994 |
| WO | PCTUS9928848 | 12/1999 |

(Continued)

OTHER PUBLICATIONS

International Search Report in PCT/US2010/01336 dated May 19, 2011.

(Continued)

*Primary Examiner* — Noel Beharry
(74) *Attorney, Agent, or Firm* — William H. Bollman

(57) ABSTRACT

An IMS emergency call is reliably handed off within the PS domain or from the PS domain to the CS domain, by providing continuous support of location of a user device on behalf of a PSAP. The invention provides for handover of an IMS emergency call with EPS/GPRS access in a multi-LRF environment. Emergency location services for CS based emergency and/or IMS based emergency location services are often provided by multiple emergency location service providers. The information element that is critical for supporting Location Continuity in Multi-LRF environment can be either the assigned ESQK or the Serving LRF address. ESQK is assigned by the Serving LRF during IMS emergency call setup, and is used to uniquely identify the emergency service provider that operates the serving LRF. A simpler implementation uses the Serving LRF's address to identify the Serving LRF during and after the handover (PS-PS or PS-CS).

9 Claims, 3 Drawing Sheets

(56) References Cited

U.S. PATENT DOCUMENTS

| | | |
|---|---|---|
| 4,952,928 A | 8/1990 | Carroll |
| 4,972,484 A | 11/1990 | Theile et al. |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,119,104 A | 6/1992 | Heller |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLucca |
| 5,289,527 A | 2/1994 | Tiedemann, Jr. |
| 5,293,642 A | 3/1994 | Lo |
| 5,299,132 A | 3/1994 | Wortham |
| 5,311,516 A | 5/1994 | Kuznicki |
| 5,325,302 A | 6/1994 | Izidon |
| 5,327,529 A | 7/1994 | Fults et al. |
| 5,334,974 A | 8/1994 | Simms |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Caroll |
| 5,398,190 A | 3/1995 | Wortham |
| 5,406,614 A | 4/1995 | Hara |
| 5,418,537 A | 5/1995 | Bird |
| 5,423,076 A | 6/1995 | Westengren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway |
| 5,539,398 A | 7/1996 | Haall |
| 5,539,829 A | 7/1996 | Lokhoff et al. |
| 5,543,776 A | 8/1996 | L'Esperance |
| 5,552,772 A | 9/1996 | Janky |
| 5,555,286 A | 9/1996 | Tendler |
| 5,568,119 A | 10/1996 | Schippler |
| 5,574,648 A | 11/1996 | Pilley |
| 5,579,372 A | 11/1996 | Angstrom |
| 5,587,201 A | 12/1996 | Rho et al. |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,618 A | 2/1997 | Lokhoff et al. |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,755 A | 8/1997 | Van De Kerkhof et al. |
| 5,682,600 A | 10/1997 | Salin |
| 5,699,053 A | 12/1997 | Jonsson |
| 5,704,029 A | 12/1997 | Wright, Jr. |
| 5,712,900 A | 1/1998 | Maupin |
| 5,717,688 A | 2/1998 | Belanger et al. |
| 5,721,781 A | 2/1998 | Deo |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montully |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossmann |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard et al. |
| 5,930,250 A | 7/1999 | Klok |
| 5,930,701 A | 7/1999 | Skog |
| 5,943,399 A | 8/1999 | Bannister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,122,503 A | 9/2000 | Daly |
| 6,122,520 A | 9/2000 | Want |
| 6,124,810 A | 9/2000 | Segal et al. |
| 6,128,664 A | 10/2000 | Yanagidate et al. |
| 6,131,028 A | 10/2000 | Whitington |

(56) References Cited

U.S. PATENT DOCUMENTS

| | | | |
|---|---|---|---|
| 6,131,067 | A | 10/2000 | Girerd |
| 6,133,874 | A | 10/2000 | Krasner |
| 6,134,483 | A | 10/2000 | Vayanos et al. |
| 6,148,197 | A | 11/2000 | Bridges |
| 6,148,198 | A | 11/2000 | Anderson |
| 6,149,353 | A | 11/2000 | Nillson |
| 6,150,980 | A | 11/2000 | Krasner |
| 6,169,891 | B1 | 1/2001 | Gorham |
| 6,173,181 | B1 | 1/2001 | Losh |
| 6,178,505 | B1 | 1/2001 | Schneider |
| 6,178,506 | B1 | 1/2001 | Quick, Jr. |
| 6,181,935 | B1 | 1/2001 | Gossman |
| 6,181,939 | B1 | 1/2001 | Ahvenainen |
| 6,185,427 | B1 | 2/2001 | Krasner |
| 6,188,354 | B1 | 2/2001 | Soliman et al. |
| 6,188,752 | B1 | 2/2001 | Wesley |
| 6,188,909 | B1 | 2/2001 | Alanara |
| 6,189,089 | B1 | 2/2001 | Walker et al. |
| 6,198,431 | B1 | 3/2001 | Gibson |
| 6,199,045 | B1 | 3/2001 | Giniger |
| 6,199,113 | B1 | 3/2001 | Alegre |
| 6,205,330 | B1 | 3/2001 | Winbladh |
| 6,208,290 | B1 | 3/2001 | Krasner |
| 6,208,854 | B1 | 3/2001 | Roberts |
| 6,215,441 | B1 | 4/2001 | Moeglein |
| 6,219,557 | B1 | 4/2001 | Havinis |
| 6,223,046 | B1 | 4/2001 | Hamill-Keays |
| 6,226,529 | B1 | 5/2001 | Bruno |
| 6,239,742 | B1 | 5/2001 | Krasner |
| 6,247,135 | B1 | 6/2001 | Feague |
| 6,249,680 | B1 | 6/2001 | Wax |
| 6,249,744 | B1 | 6/2001 | Morita |
| 6,249,783 | B1 | 6/2001 | Crone et al. |
| 6,253,074 | B1 | 6/2001 | Carlsson |
| 6,260,147 | B1 | 7/2001 | Quick, Jr. |
| 6,266,614 | B1 | 7/2001 | Alumbaugh |
| 6,275,692 | B1 | 8/2001 | Skog |
| 6,275,849 | B1 | 8/2001 | Ludwig |
| 6,278,701 | B1 | 8/2001 | Ayyagari |
| 6,289,373 | B1 | 9/2001 | DeZonno |
| 6,307,504 | B1 | 10/2001 | Sheynblat |
| 6,308,269 | B2 | 10/2001 | Proidl |
| 6,313,786 | B1 | 11/2001 | Sheynblat et al. |
| 6,317,594 | B1 | 11/2001 | Gossman |
| 6,321,091 | B1 | 11/2001 | Holland |
| 6,321,092 | B1 | 11/2001 | Fitch |
| 6,321,250 | B1 | 11/2001 | Knape |
| 6,321,257 | B1 | 11/2001 | Kotola |
| 6,324,542 | B1 | 11/2001 | Wright, Jr. |
| 6,327,473 | B1 | 12/2001 | Soliman et al. |
| 6,327,479 | B1 | 12/2001 | Mikkola |
| 6,333,919 | B2 | 12/2001 | Gaffney |
| 6,360,102 | B1 | 3/2002 | Havinis |
| 6,367,019 | B1 | 4/2002 | Ansell |
| 6,370,389 | B1 | 4/2002 | Isomursu |
| 6,377,209 | B1 | 4/2002 | Krasner |
| 6,400,314 | B1 | 6/2002 | Krasner |
| 6,400,958 | B1 | 6/2002 | Isomursu |
| 6,411,254 | B1 | 6/2002 | Moeglein |
| 6,421,002 | B2 | 7/2002 | Krasner |
| 6,433,734 | B1 | 8/2002 | Krasner |
| 6,449,473 | B1 | 9/2002 | Raivisto |
| 6,449,476 | B1 | 9/2002 | Hutchison, IV |
| 6,456,852 | B2 | 9/2002 | Bar |
| 6,477,150 | B1 | 11/2002 | Maggenti |
| 6,504,491 | B1 | 1/2003 | Christians |
| 6,505,049 | B1 | 1/2003 | Dorenbosch |
| 6,510,387 | B2 | 1/2003 | Fuchs et al. |
| 6,512,922 | B1 | 1/2003 | Burg et al. |
| 6,512,930 | B2 | 1/2003 | Sandegren |
| 6,515,623 | B2 | 2/2003 | Johnson |
| 6,519,466 | B2 | 2/2003 | Pande et al. |
| 6,522,682 | B1 | 2/2003 | Kohli et al. |
| 6,529,490 | B1 | 3/2003 | Oh |
| 6,529,722 | B1 | 3/2003 | Heinrich |
| 6,529,829 | B2 | 3/2003 | Turetzky et al. |
| 6,531,982 | B1 | 3/2003 | White et al. |
| 6,538,757 | B1 | 3/2003 | Sansone |
| 6,539,200 | B1 | 3/2003 | Schiff |
| 6,539,232 | B2 | 3/2003 | Hendrey et al. |
| 6,539,304 | B1 | 3/2003 | Chansarkar |
| 6,542,464 | B1 | 4/2003 | Takeda |
| 6,542,734 | B1 | 4/2003 | Abrol et al. |
| 6,542,743 | B1 | 4/2003 | Soliman |
| 6,549,522 | B1 | 4/2003 | Flynn |
| 6,549,776 | B1 | 4/2003 | Joong |
| 6,549,844 | B1 | 4/2003 | Egberts |
| 6,556,832 | B1 | 4/2003 | Soliman |
| 6,560,456 | B1 | 5/2003 | Lohita |
| 6,560,534 | B2 | 5/2003 | Abraham et al. |
| 6,570,530 | B2 | 5/2003 | Gaal et al. |
| 6,571,095 | B1 | 5/2003 | Koodli |
| 6,574,558 | B2 | 6/2003 | Kohli |
| 6,584,307 | B1 | 6/2003 | Antonucci |
| 6,584,552 | B1 | 6/2003 | Kuno |
| 6,594,500 | B2 | 7/2003 | Bender et al. |
| 6,597,311 | B2 | 7/2003 | Sheynblat et al. |
| 6,600,927 | B2 | 7/2003 | Hamilton |
| 6,606,495 | B1 | 8/2003 | Korpi et al. |
| 6,606,554 | B2 | 8/2003 | Edge |
| 6,609,004 | B1 | 8/2003 | Morse et al. |
| 6,611,757 | B2 | 8/2003 | Brodie |
| 6,618,670 | B1 | 9/2003 | Chansarkar |
| 6,621,452 | B2 | 9/2003 | Knockeart et al. |
| 6,621,810 | B1 | 9/2003 | Leung |
| 6,628,233 | B2 | 9/2003 | Knockeart et al. |
| 6,630,093 | B1 | 10/2003 | Jones |
| 6,633,255 | B2 | 10/2003 | Krasner |
| 6,640,184 | B1 | 10/2003 | Rabe |
| 6,650,901 | B1 | 11/2003 | Schuster |
| 6,661,372 | B1 | 12/2003 | Girerd |
| 6,665,539 | B2 | 12/2003 | Sih et al. |
| 6,665,541 | B1 | 12/2003 | Krasner et al. |
| 6,671,620 | B1 | 12/2003 | Garin et al. |
| 6,677,894 | B2 | 1/2004 | Sheynblat et al. |
| 6,678,357 | B2 | 1/2004 | Stumer |
| 6,680,694 | B1 | 1/2004 | Knockeart et al. |
| 6,680,695 | B2 | 1/2004 | Turetzky et al. |
| 6,694,258 | B2 | 2/2004 | Johnson et al. |
| 6,697,629 | B1 | 2/2004 | Grilli et al. |
| 6,701,144 | B2 | 3/2004 | Kirbas et al. |
| 6,703,971 | B2 | 3/2004 | Pande et al. |
| 6,703,972 | B2 | 3/2004 | van Diggelmen |
| 6,704,651 | B2 | 3/2004 | van Diggelmen |
| 6,707,421 | B1 | 3/2004 | Drury et al. |
| 6,714,793 | B1 | 3/2004 | Carey et al. |
| 6,718,174 | B2 | 4/2004 | Vayanos |
| 6,720,915 | B2 | 4/2004 | Sheynblat |
| 6,721,578 | B2 | 4/2004 | Minear et al. |
| 6,721,871 | B2 | 4/2004 | Piispanen |
| 6,724,342 | B2 | 4/2004 | Bloebaum et al. |
| 6,725,159 | B2 | 4/2004 | Krasner |
| 6,728,545 | B1 | 4/2004 | Belcea |
| 6,731,940 | B1 | 5/2004 | Nagendran |
| 6,734,821 | B2 | 5/2004 | van Diggelen |
| 6,738,013 | B2 | 5/2004 | Orler |
| 6,738,800 | B1 | 5/2004 | Aquilon |
| 6,741,842 | B2 | 5/2004 | Goldberg et al. |
| 6,744,856 | B2 | 6/2004 | Karnik |
| 6,745,038 | B2 | 6/2004 | Callaway |
| 6,747,596 | B2 | 6/2004 | Orler |
| 6,748,195 | B1 | 6/2004 | Philips |
| 6,751,464 | B1 | 6/2004 | Burg et al. |
| 6,756,938 | B2 | 6/2004 | Zhao et al. |
| 6,757,266 | B1 | 6/2004 | Hundscheidt |
| 6,757,544 | B2 | 6/2004 | Rangarajan et al. |
| 6,771,742 | B2 | 8/2004 | McCalmont |
| 6,772,340 | B1 | 8/2004 | Peinado |
| 6,775,655 | B1 | 8/2004 | Peinado |
| 6,775,802 | B2 | 8/2004 | Gaal |
| 6,778,136 | B2 | 8/2004 | Groneneyer |
| 6,778,885 | B2 | 8/2004 | Agashe et al. |
| 6,781,963 | B2 | 8/2004 | Crockett |
| 6,788,249 | B1 | 9/2004 | Farmer et al. |

(56) References Cited

U.S. PATENT DOCUMENTS

| | | |
|---|---|---|
| 6,795,699 B1 | 9/2004 | McCraw et al. |
| 6,799,049 B1 | 9/2004 | Zellner |
| 6,799,050 B1 | 9/2004 | Krasner |
| 6,801,159 B2 | 10/2004 | Swope et al. |
| 6,804,524 B1 | 10/2004 | Vandermeijden |
| 6,808,534 B1 | 10/2004 | Escano |
| 6,810,323 B1 | 10/2004 | Bullock et al. |
| 6,813,264 B2 | 11/2004 | Vassilovski |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong et al. |
| 6,820,069 B1 | 11/2004 | Kogan |
| 6,829,475 B1 | 12/2004 | Lee et al. |
| 6,832,373 B2 | 12/2004 | O'Neil |
| 6,839,020 B2 | 1/2005 | Geir et al. |
| 6,839,021 B2 | 1/2005 | Sheynblat et al. |
| 6,839,417 B2 | 1/2005 | Weisman |
| 6,842,715 B1 | 1/2005 | Gaal |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor |
| 6,873,854 B2 | 3/2005 | Crockett |
| 6,882,850 B2 | 4/2005 | McConnell et al. |
| 6,885,940 B2 | 4/2005 | Brodie et al. |
| 6,888,497 B2 | 5/2005 | King et al. |
| 6,888,932 B2 | 5/2005 | Snip |
| 6,895,238 B2 | 5/2005 | Nevell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes et al. |
| 6,912,545 B1 | 6/2005 | Lundy |
| 6,915,208 B2 | 7/2005 | Garin et al. |
| 6,917,331 B2 | 7/2005 | Gronemeyer |
| 6,930,634 B2 | 8/2005 | Peng et al. |
| 6,937,187 B2 | 8/2005 | van Diggelen |
| 6,937,597 B1 | 8/2005 | Rosenburg |
| 6,937,872 B2 | 8/2005 | Krasner |
| 6,940,950 B2 | 9/2005 | Dickinson |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,073 B2 | 10/2005 | Bye |
| 6,961,019 B1 | 11/2005 | McConnell et al. |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,195 B2 | 11/2005 | Nowak |
| 6,970,917 B1 | 11/2005 | Kushwaha |
| 6,973,320 B2 | 12/2005 | Brown et al. |
| 6,975,266 B2 | 12/2005 | Abraham et al. |
| 6,978,453 B2 | 12/2005 | Rao |
| 6,980,816 B2 | 12/2005 | Rohles |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger et al. |
| 7,024,393 B1 | 4/2006 | Peinado |
| 7,047,411 B1 | 5/2006 | DeMello |
| 7,065,351 B2 | 6/2006 | Carter et al. |
| 7,065,507 B2 | 6/2006 | Mohammed |
| 7,072,667 B2 | 7/2006 | Olrik |
| 7,079,857 B2 | 7/2006 | Maggenti |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,838 B1 | 11/2006 | Peinado |
| 7,151,946 B2 | 12/2006 | Maggenti |
| 7,177,397 B2 | 2/2007 | McCalmont |
| 7,177,399 B2 | 2/2007 | Dawson |
| 7,184,418 B1 | 2/2007 | Baba |
| 7,200,380 B2 | 4/2007 | Havlark |
| 7,209,969 B2 | 4/2007 | Lahti |
| 7,218,940 B2 | 5/2007 | Niemenmaa |
| 7,221,959 B2 | 5/2007 | Lindqvist |
| 7,245,900 B1 | 7/2007 | Lamb |
| 7,246,187 B1 | 7/2007 | Ezra |
| 7,260,186 B2 | 8/2007 | Zhu |
| 7,260,384 B2 | 8/2007 | Bales et al. |
| 7,321,773 B2 | 1/2008 | Hines et al. |
| 7,330,899 B2 | 2/2008 | Wong |
| 7,333,480 B1 | 2/2008 | Clarke |
| 7,366,157 B1 | 4/2008 | Valentine |
| 7,428,571 B2 | 9/2008 | Ichimura |
| 7,436,785 B1 | 10/2008 | McMullen |
| 7,440,442 B2 | 10/2008 | Grabelsky et al. |
| 7,522,581 B2 | 4/2009 | Acharya |
| 7,623,447 B1 | 11/2009 | Faccin |
| 7,702,081 B1 | 4/2010 | Klesper |
| 7,764,961 B2 | 7/2010 | Zhu et al. |
| 7,783,297 B2 | 8/2010 | Ishii |
| 7,895,263 B1 | 2/2011 | Kirchmeier |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069259 A1 | 6/2002 | Kushwaha |
| 2002/0085538 A1 | 7/2002 | Leung |
| 2002/0086659 A1 | 7/2002 | Lauper |
| 2002/0102996 A1 | 8/2002 | Jenkins |
| 2002/0102999 A1 | 8/2002 | Maggenti |
| 2002/0103898 A1 | 8/2002 | Moyer et al. |
| 2002/0112047 A1 | 8/2002 | Kushwaha |
| 2002/0118650 A1 | 8/2002 | Jagadeesan |
| 2002/0123354 A1 | 9/2002 | Nowak |
| 2002/0156732 A1 | 10/2002 | Odijk |
| 2002/0173317 A1 | 11/2002 | Nykanen |
| 2002/0191595 A1 | 12/2002 | Mar |
| 2002/0197991 A1 | 12/2002 | Anvekar |
| 2003/0009602 A1 | 1/2003 | Jacobs |
| 2003/0012148 A1 | 1/2003 | Peters |
| 2003/0016804 A1 | 1/2003 | Sheha |
| 2003/0037163 A1 | 2/2003 | Kitada |
| 2003/0054835 A1 | 3/2003 | Gutowski et al. |
| 2003/0065788 A1 | 4/2003 | Salomaki |
| 2003/0072318 A1 | 4/2003 | Lam |
| 2003/0078064 A1 | 4/2003 | Chan |
| 2003/0078886 A1 | 4/2003 | Minear |
| 2003/0081557 A1 | 5/2003 | Mettala |
| 2003/0081752 A1 | 5/2003 | Trandal |
| 2003/0086539 A1 | 5/2003 | McCalmont |
| 2003/0096623 A1 | 5/2003 | Kim |
| 2003/0101329 A1 | 5/2003 | Lahti |
| 2003/0103484 A1 | 6/2003 | Oommen |
| 2003/0114148 A1 | 6/2003 | Albertson |
| 2003/0115328 A1 | 6/2003 | Salminen |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0182053 A1 | 9/2003 | Swope et al. |
| 2003/0186709 A1 | 10/2003 | Rhodes |
| 2003/0196105 A1 | 10/2003 | Fineberg |
| 2003/0201931 A1 | 10/2003 | Durst |
| 2003/0204640 A1 | 10/2003 | Sahinoja |
| 2003/0223381 A1 | 12/2003 | Schrodens |
| 2004/0002326 A1 | 1/2004 | Maher |
| 2004/0032485 A1 | 2/2004 | Stephens |
| 2004/0041729 A1 | 3/2004 | Rowitch |

(56) References Cited

U.S. PATENT DOCUMENTS

| | | |
|---|---|---|
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0098497 A1 | 5/2004 | Banet |
| 2004/0132465 A1 | 7/2004 | Mattila |
| 2004/0146040 A1 | 7/2004 | Phan-Anh |
| 2004/0166856 A1* | 8/2004 | Niemenmaa ................ 455/436 |
| 2004/0184584 A1 | 9/2004 | McCalmont |
| 2004/0198375 A1 | 10/2004 | Schwengler et al. |
| 2004/0198386 A1 | 10/2004 | Dupray |
| 2004/0203922 A1 | 10/2004 | Hines et al. |
| 2004/0204847 A1 | 10/2004 | Yanai |
| 2004/0205151 A1 | 10/2004 | Sprigg |
| 2004/0229632 A1 | 11/2004 | Flynn |
| 2004/0242238 A1 | 12/2004 | Wang |
| 2004/0267445 A1 | 12/2004 | DeLuca |
| 2005/0028034 A1 | 2/2005 | Gantman |
| 2005/0031095 A1 | 2/2005 | Pietrowicz |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0048987 A1 | 3/2005 | Glass |
| 2005/0086467 A1 | 4/2005 | Asokan |
| 2005/0107673 A1 | 5/2005 | Ball |
| 2005/0112030 A1 | 5/2005 | Gaus |
| 2005/0119012 A1 | 6/2005 | Merheb |
| 2005/0136885 A1 | 6/2005 | Kaltsukis |
| 2005/0190892 A1 | 9/2005 | Dawson |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0259675 A1 | 11/2005 | Tuohino et al. |
| 2005/0261002 A1 | 11/2005 | Cheng |
| 2005/0271029 A1 | 12/2005 | Iffland |
| 2005/0282518 A1 | 12/2005 | D'Evelyn |
| 2005/0287979 A1 | 12/2005 | Rollender |
| 2006/0008065 A1 | 1/2006 | Longman et al. |
| 2006/0023747 A1 | 2/2006 | Koren et al. |
| 2006/0025154 A1 | 2/2006 | Alapuranen et al. |
| 2006/0053225 A1 | 3/2006 | Poikselka |
| 2006/0079236 A1 | 4/2006 | Del Pino |
| 2006/0109960 A1 | 5/2006 | D'Evelyen |
| 2006/0128395 A1 | 6/2006 | Muhonen |
| 2006/0154665 A1 | 7/2006 | Svensson |
| 2006/0184617 A1 | 8/2006 | Nicholas |
| 2006/0188083 A1 | 8/2006 | Breen |
| 2006/0189303 A1 | 8/2006 | Rollender |
| 2006/0193447 A1 | 8/2006 | Schwartz |
| 2006/0205383 A1 | 9/2006 | Rollender |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0234639 A1 | 10/2006 | Kushwaha |
| 2006/0234698 A1 | 10/2006 | Folk |
| 2006/0246919 A1 | 11/2006 | Park et al. |
| 2006/0258380 A1 | 11/2006 | Liebowitz |
| 2006/0293066 A1 | 12/2006 | Edge |
| 2007/0003024 A1 | 1/2007 | Olivier |
| 2007/0019614 A1 | 1/2007 | Hoffman |
| 2007/0021908 A1 | 1/2007 | Jaugilas |
| 2007/0022011 A1 | 1/2007 | Altberg |
| 2007/0026854 A1 | 2/2007 | Nath |
| 2007/0026871 A1 | 2/2007 | Wager |
| 2007/0030539 A1 | 2/2007 | Nath |
| 2007/0049288 A1 | 3/2007 | Lamprecht |
| 2007/0060097 A1 | 3/2007 | Edge |
| 2007/0115941 A1 | 5/2007 | Patel |
| 2007/0121601 A1 | 5/2007 | Kikinis |
| 2007/0149166 A1* | 6/2007 | Turcotte et al. ............ 455/404.1 |
| 2007/0149213 A1 | 6/2007 | Lamba |
| 2007/0253429 A1 | 11/2007 | James |
| 2007/0254625 A1 | 11/2007 | Edge |
| 2007/0263610 A1 | 11/2007 | Mitchell |
| 2007/0291733 A1 | 12/2007 | Doran |
| 2008/0008157 A1* | 1/2008 | Edge et al. ................... 370/351 |
| 2008/0045250 A1 | 2/2008 | Hwang |
| 2008/0162637 A1 | 7/2008 | Adamczyk |
| 2008/0176582 A1 | 7/2008 | Ghai |
| 2008/0186164 A1 | 8/2008 | Emigh |
| 2008/0200182 A1 | 8/2008 | Shim |
| 2008/0214202 A1 | 9/2008 | Toomey |
| 2009/0003535 A1 | 1/2009 | Grabelsky |
| 2009/0067417 A1 | 3/2009 | Kalavade |
| 2009/0097450 A1 | 4/2009 | Wallis |
| 2009/0128404 A1 | 5/2009 | Martino |
| 2010/0003976 A1 | 1/2010 | Zhu |
| 2010/0054209 A1* | 3/2010 | Mahdi ........................ 370/331 |
| 2010/0054220 A1 | 3/2010 | Bischinger et al. |
| 2010/0067444 A1 | 3/2010 | Faccin |
| 2010/0167760 A1 | 7/2010 | Kim |
| 2010/0188992 A1 | 7/2010 | Raleigh |
| 2010/0198933 A1 | 8/2010 | Smith |
| 2010/0202407 A1* | 8/2010 | Edge ........................... 370/331 |
| 2010/0223222 A1 | 9/2010 | Zhou et al. |
| 2013/0012232 A1 | 1/2013 | Titus et al. |

FOREIGN PATENT DOCUMENTS

| | | |
|---|---|---|
| WO | PCTUS0146666 | 11/2001 |
| WO | WO02/11407 | 2/2002 |
| WO | WO2007027166 | 3/2007 |

OTHER PUBLICATIONS

International Search Report in PCT/US2010/01336 dated Jul. 2, 2010.

Schulzrinne et al., Emergency Services for Internet Telephony Systems draft-schulzrinne-sipping-emergency-arch, IETF Standard Working Draft, Feb. 4, 2004, 1-22.

Qualcomm CDMA Technologies, LBS Control Plane/User Plane Overview—80-VD378-1NP B, 2009, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

Chin, Le-Pond, The Study of the Interconnection of GSM Mobile Communication System Over IP Based Network, 2001, 2219-2223.

Zhao, Yilin, Efficient and Reliable Data Transmission for Cellular and GPS Based Mayday Systems, Motorola, 1998, 555-559.

U.S. Appl. No. 09/539,495, filed Mar. 2000, Abrol.

International Search Report received in PCT/US2011/02001 dated Apr. 27, 2012.

International Search Report received in PCT/US2011/000100 dated Apr. 24, 2012.

International Search Report received in PCT/US2011/001990 dated Apr. 24, 2012.

* cited by examiner

MULTIPLE LOCATION RETRIEVAL FUNCTION (LRF) NETWORK HAVING LOCATION CONTINUITY

This application claims priority from U.S. Provisional Application No. 61/213,084, entitled "Multiple Location Retrieval Function (LRF) Network Having Location Continuity" to Yinjun Zhu, filed May 5, 2009, the entirety of which is explicitly incorporated herein by reference.

BACKGROUND OF THE INVENTION

1. Field of the Invention

This invention relates generally to wireless telecommunication. More particularly, it relates to 3GPP ($3^{rd}$ Generation Partnership Project) location continuity using long term evolution (LTE)/System Architecture Evolution (SAE) access.

2. Background of the Related Art

Long Term Evolution (LTE) of the $3^{rd}$ Generation Partnership Project (3GPP) is the next stage of wireless communications, introduced in the 3GPP Release 8. This 3GPP project improves the Universal Mobile Telecommunications System (UMTS) mobile phone standard to provide an enhanced user experience and simplified technology for next generation mobile broadband. Much of 3GPP Release 8 is oriented towards a $4^{th}$ Generation (4G) mobile communications technology and an all-Internet Protocol (IP) architecture system. A copy of "$3^{rd}$ Generation Partnership Project; Technical Specification Group Core Network and Terminals; Mobile Application Part (MAP) Specification; (Release 8)", 3GPP TS 29.002 V8.1.0 (2007-03), is filed herewith by way of Information Disclosure Statement, and is incorporated by reference into this background in its entirety.

SAE is an evolution of the General Packet Radio Service (GPRS) core network, but it's an all-IP network. The main component of the SAE architecture is the Evolved Packet Core (EPC), also known as the SAE Core. The EPC will serve as equivalent of GPRS networks (via the Mobility Management Entity, Serving Gateway and PDN Gateway subcomponents). The subcomponents of the EPC include a Mobility Management Entity (MME), a Serving Gateway (S-GW), and a Packet Data Network Gateway (PDN-GW).

The MME is the key control-node for the LTE access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The PDN provides connectivity to the UE to external packet data networks by being the point of exit and entry of traffic for the UE. A UE may have simultaneous connectivity with more than one PDN for accessing multiple PDNs. The PDN performs policy enforcement, packet filtering for each user, charging support, lawful Interception and packet screening. Another key role of the PDN is to act as the anchor for mobility between 3GPP and non-3GPP technologies such as WiMAX and 3GPP2 (CDMA 1× and EvDO).

Depending on the deployments of a telephony network operator, regional requirements, reliability of emergency services, and other operational reasons, it is very common in North America that a telephony network (wireless or fixed line) is divided into different emergency service regions. The emergency location services of the service regions may be provided by a single emergency location service provider, or very often by multiple emergency location service providers. Sometimes load balancing and redundancy requirements of emergency location services require multiple emergency location service providers for a network.

Location Retrieval Function (LRF) is a functional entity that handles the retrieval of location information for a user entity (UE).

For the existing 3GPP circuit switched (CS) based emergency location services defined in 23.271 of the 3GPP Specification, when a location estimate is required for a target user equipment (UE)/mobile station (MS) with an established emergency call in a state of inter-visited mobile switching center (VMSC)/MSC server handover, all location request related messages are sent via Mobile Application Part (MAP)/E interface piggy-backed in MAP_FORWARD_ACCESS_SIGNALLING and MAP PROCESS_ACCESS_SIGNALLING between the visited and serving MSCs/MSC servers. The serving GMLC only needs to communicate with an anchor MSC/MSC server during an emergency call.

In the Release 9 version of an SAE network, an IP Multimedia Subsystem (IMS) emergency call will be provided using the underlying IP Bearer established over E-UTRAN/UTRRN access network. It is very important to note that the IMS Emergency procedure defined in 23.167 is independent from the procedures of SAE/GPRS, including the Control Plane Location Service procedures, the only interworking function between these two service domains resides in the serving LRF. Some challenges/issues have been identified when there are multiple IMS emergency location service providers (i.e. multiple LRFs) in a network:

There is not a signal tunneling mechanism (like the one in the CS domain) available, the serving LRF needs to know the current serving location server (GMLC/MPC for control plane or E-SLP for user plane) and the serving node after a handover (either PS-PS or PS-CS) crossing the service regions of the emergency location service providers.

Due to the fact that IMS domain and signaling domain of U-TRAN Access and Location Services are decoupled, it is possible that IP Bearer has been established and emergency NI-LR has been initiated, but a handover occurs crossing the service regions of the emergency location service providers before an IMS Emergency call is initiated. Or it is possible that the IP bearer of an emergency IMS call would not yet be released after the IMS emergency call is terminated, another emergency call is placed using the same bearer (but where the emergency location area would be different).

MME Pool may be deployed; the MME may be dynamically assigned. But the inventor herein appreciates that there is not a fixed mapping between E-Cell and MME, thus the serving LRF cannot use the serving E-Cell ID that is available via IMS signaling to determine the serving node and serving location server after a handover crossing the service areas of emergency location service providers.

It has been noted that User Plane Location Service using OMA SUPL may also be used for IMS emergency location services, but there are limitations of OMA SUPL 2.0. The recommended solution preferably should support handover scenarios from a UP based emergency location service provider to a CP based emergency location service provider, but the requirements for an additional User Plane are not in the scope of 3GPP. Although in 3GPP Rel-9, the scope of emergency location continuity is limited to one single carrier, and the scope of IMS emergency voice call continuity (VCC) is limited to the PS to CS direction only. (Voice call continuity (VCC) is an IMS service standardized in 3GPP TS 23.206. Using VCC, ongoing calls can be switched from wireless to WiFi at any time using 2G/3G/WiFi handsets, or transferred at any time to another handset.)

Using current technology, emergency location services associated with IMS emergency calls may be interrupted when there are multiple LRFs deployed in the network. In such a case, a public service access point (PSAP) would not be supported following a handover of an IMS emergency call.

SUMMARY OF THE INVENTION

In accordance with the principles of the present invention, a location retrieval function network device in a multiple location retrieval function network to ensure voice call continuity (VCC) during a handover of an emergency call from a user wireless device comprises receiving control of an initiated IP Multimedia Subsystem (IMS) emergency call from a user wireless device, and participating in a handover of the IMS emergency call from a first emergency services network to a second emergency services network. Either an emergency services routing key (ESRK) or an emergency services query key (ESQK) is routed from a source server in the first emergency services network to a target server in the second emergency services network.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Figure 1A:
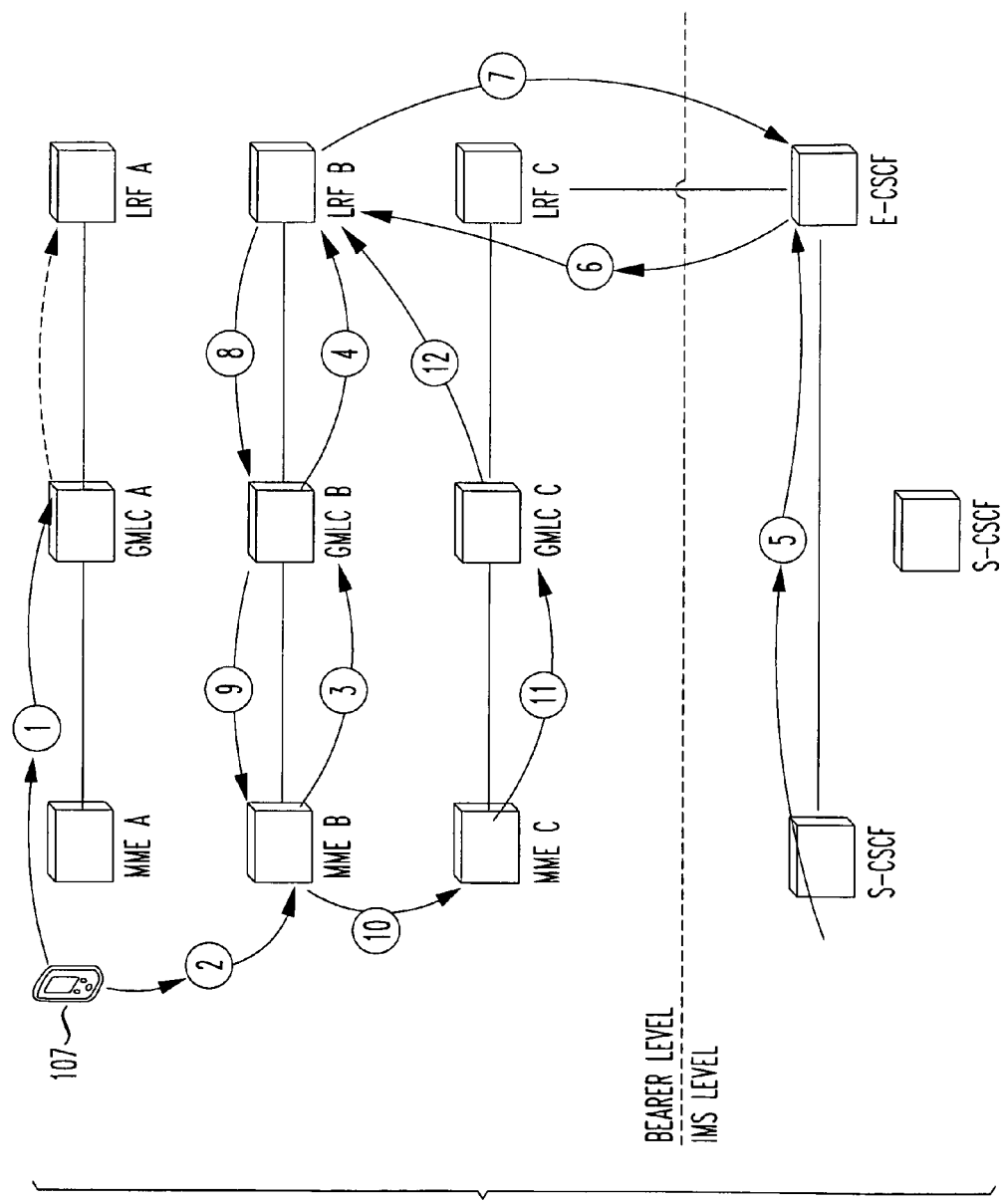
FIG. 1A illustrates a high-level call flow example of Location Continuity for IMS Emergency Call in a Multi-LRF 3GPP network that deploys control plane location services for IMS emergency, in accordance with the principles of the present invention.

The present invention provides for the reliable handoff of an IMS emergency call within the PS domain or from the PS domain to the CS domain, by providing continuous support of location of a user equipment (UE) device on behalf of a Public Service Access Point (PSAP), particularly in a multi-LRF network environment.

A VMSC/MSC server procedure for Inter-VMSC/MSC server handover is provided to handle handover. When a location estimate is required for a target UE with an established call in a state of inter-VMSC/MSC server handover, the serving location area ID is preferably used by the visited MSC/MSC server to identify the correct RAN to serve the location request. All location request related messages are preferably sent via MAP/E interface piggy-backed in MAP_FORWARD_ACCESS_SIGNALLING and MAP_PROCESS_ACCESS_SIGNALLING between the visited and serving MSCs/MSC servers.

In the case where a request for positioning arrives during the handling of an ongoing handover, if during the ongoing handover procedure a request for location information arrives, the request is preferably suspended until the handover is completed. On completion of the handover, the location preparation procedure may then continue.

In the case of hard handovers in Iu mode, e.g. inter RNC hard handover, or Serving RNC relocation, and inter-MSC, MSC Server or SGSN handovers, the ongoing positioning process is aborted on Iu level. In soft handovers where the Serving RNS and Iu are relocated, any ongoing positioning process is also aborted on Iu level. The MSC, MSC Server or SGSN shall restart the Iu aborted location requests with the new Serving RNC. The new SGSN, however, shall not restart the location request after inter SGSN Routing Area Update or inter SGSN relocation. During intra and inter RNC soft and softer handovers, the existing RRC connection can normally be used without any need to abort the on-going positioning process on Iu level.

The invention also provides for handover of an IMS emergency call with EPS/GPRS access in a multi-LRF environment. As a deployment option in North America, the emergency location services for CS based emergency and/or IMS based emergency location services may be provided by a single emergency location service provider, or very often by multiple emergency location service providers. Handover of the IP bearer for an established or not yet established IMS emergency call may occur within the PS domain (i.e. intra E-UTRAN, intra UTRAN, E-UTRAN to UTRAN, UTRAN to E-UTRAN or E-UTRAN to HRPD) as defined in TS 23.401[42], TS 23.402[43] and TS 23.060 [15]. Handover of an already established IMS emergency call may also occur from the PS domain to the CS domain using single radio voice call continuity (SRVCC) as defined in TS 23.216[41]. When such an event occurs in a context where location support for the emergency call is required on the source side, continuity of location support may be required on the target side. In this case, the location solution employed on the source and target access sides may stay the same or may change. In addition, some reconfiguration of the associated location server or servers (e.g. GMLC, LRF, E-SLP) and serving node may be needed whether or not the solution changes. Once the IMS emergency call is established, the serving LRF preferably remains the same after possible sequential handovers.

Some potential alternative solutions for supporting LCS Continuity in Multi-LRF environment have been identified:

Option 1: A central location server/register caches all the location information of an IMS emergency caller. At the minimum, the location information cached in the central location server includes the current Serving Node Identity, current Serving Location Server address, and optional last known location estimates.

Option 2: The serving LRF Identity (either LRF address or ESQK that the Serving LRF assigned to the IMS emergency call) is passed to a Source Location Server, Source Serving Node, Target Serving Node and Target Location Server. The Target Location Server uses the LRF Identity to determine where to send a handover location report. It should be noted that the LRF Identity is preferably included in the handoff signalling from the source serving node to the target serving node.

There are some other alternatives that had been considered, e.g., ensuring that the first Serving Node Identity is passed to the Target Serving Node and Target GMLC, in which case the Target GMLC can use the first Serving Node Identity to determine the actual Serving LRF. However, since the IMS Emergency Call setup procedure is independent from the procedure of IP Bearer Setup, PS handoff may already have happened before the IMS call is initiated. In addition, the MME Pool feature may be implemented, in which case there is no fixed mapping from Serving Node to Serving GMLC. A similar option ensures that the Source Serving Node always send the Target Serving Node Identity to the Target GMLC, but this option has the same limitations.

Another discussed alternative is to use ISUP signalling to pass the key information during the single radio-voice call continuity (SR-VCC) procedure. However, this alternative was rejected by the industry for lack of support.

The information element that is critical for supporting Location Continuity in Multi-LRF environment can be either the assigned ESQK or the Serving LRF address. ESQK is assigned by the Serving LRF during IMS emergency call setup per 23.167, and is used to uniquely identify the emergency service provider that operates the serving LRF. However, each emergency service provider may own a large ESQK pool for its service regions. A simpler implementation uses the Serving LRF's address to identify the Serving LRF during and after the handover (PS-PS or PS-CS).

Figure 1B:
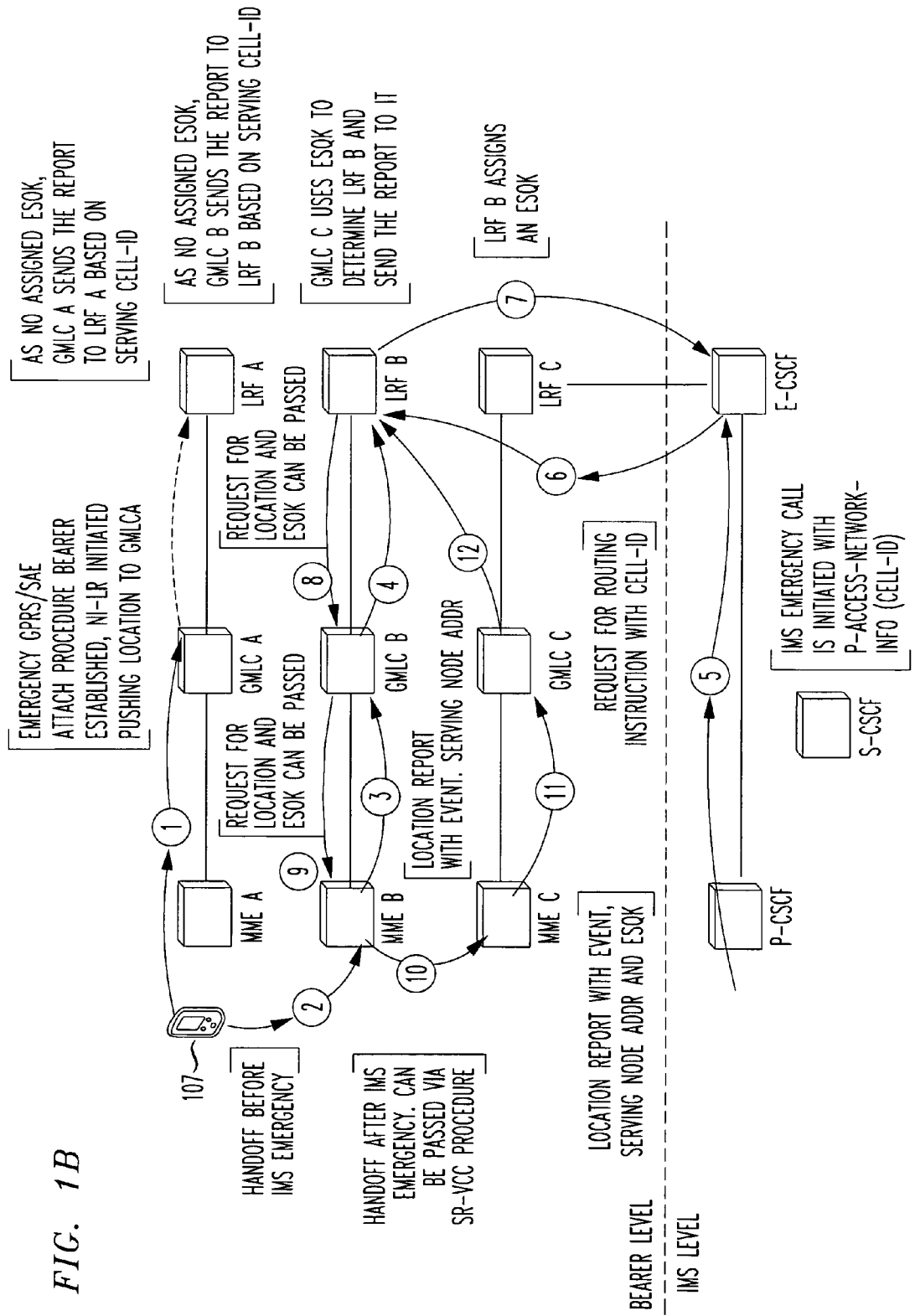
FIG. 1B shows FIG. 1A with descriptive captions associated with various steps of the illustrated call flow.

FIG. 1A illustrates a high-level call flow example of Location Continuity for IMS Emergency Call in a Multi-LRF 3GPP network that deploys control plane location services for IMS emergency, in accordance with the principles of the present invention. FIG. 1B shows FIG. 1A with descriptive captions associated with various steps of the illustrated call flow.

In particular, as shown in step 1 of FIGS. 1A and 1B, following a request for an emergency call from a wireless device 107, a UE establishes an emergency PDN connection for E-UTRAN access or an emergency PDP context for UTRAN PS access. The serving MME (MME A) initiates an emergency NI-LR location procedure and a Subscriber Location Report with UE identity, emergency event indicator, Serving Node Identity and serving cell identity to the GMLC that MME A is associated with by configuration. Since no Serving LRF Address information is included in the report, GMLC A forwards the report to the LRF determined by the serving cell identity.

In step 2, at some later time, a PS to PS handover occurs before an IMS based emergency call is initiated.

In step 3, MME B (Target MME) initiates a Subscriber Location Report with UE identity, handover event indicator, Serving Node Identity and serving cell identity, to GMLC B to which MME B is associated based on configuration.

In step 4, since no Serving LRF Address information is included in the report, GMLC B forwards the received message to the LRF that is determined by the serving cell identity.

In step 5, an IMS emergency call is initiated by the UE to the Emergency Call Session Control Function (E-CSCF) per 23.167.

In step 6, based on the serving cell identity that is included in the IMS SIP INVITE signalling, the E-CSCF determines that the serving LRF is LRF B and sends a request to LRF B requesting emergency call routing instructions per 23.167.

In step 7, based on the serving cell identity and optional other location information provided, LRF B determines the PSAP that the IMS emergency call should be routed to, and assigned an ESQK to the call. LRF B then sends the assigned ESQK back to the E-CSCF.

In step 8, based on the serving cell identity, LRF B determines that the serving GMLC is GMLC B, then it sends a request to GMLC B for updated location.

In step 9, based on the cached information of IMS emergency call instances, GMLC B matches the UE identity and determines the Serving Node. It then initiates a MT-LR procedure and sends Provide Subscriber Location with UE identity, and a Serving LRF Address to MME B. MME B caches the Serving LRF Address. Depending on whether or not Control Plane Location is deployed, the MME B may initiate location procedure in the radio access network.

In step 10, another handover occurs, as part of the handover procedure, and MME B sends the Serving LRF Address in the handover request to MME C (Target Serving Node). Optionally MME B sends the handover location report to the serving GMLC (GMLC B) and Serving LRF (LRF B) with the UE's identity, Source Serving Node Identity, Target Serving Node Identity and a handover event indicator.

In step 11, upon completion of handover, MME C initiates a Subscriber Location Report message with the UE's identity, handover event indicator, serving cell identity, Serving Node Identity and Serving LRF Address to the associated GMLC (GMLC C) based on its configuration.

In step 12, when receiving a handover location report with the Serving LRF Address, GMLC C forwards the report to LRF B indicated by the Serving LRF's Address. If the PSAP requests an updated location of the UE, LRF B uses the Serving Node Identity to determine the Serving GMLC, and the serving cell identity to determine the Serving Node, and initiates MT-LR location procedures.

Option 2, shown in FIGS. 1A and 1B, fulfils the requirements of supporting all the scenarios of PS-to-PS handover and PS-to-CS handover, while Control Plane solutions are supported in the source and target networks. It should be noted that supporting IMS emergency call related User Plane location continuity is out of the scope of the Rel-9 recommendations. However, for information purposes, when a User Plane solution is deployed in the source network, it is recommended that the SLg/Lg interface (excluding E-SMLC/SMLC/SAS) should also be supported as part of the requirements to support Location Continuity in a multi-LRF environment, and then all possible handover scenarios are supported.

Below are preferable requirements to support location continuity in a multi-LRF environment. The following table summarizes the support of different handover scenarios of the proposed solution (Option 2). Note that in all cases, in a multi-LRF deployment environment, the LRF that was originally assigned to the IMS emergency call as was conventionally known must be retained after handover to avoid any impact to the emergency center/PSAP, although the network configuration for normal emergency call initiation may associate the target serving cell, and target serving GMLC, with a different LRF.

| Source Access Side(s) | Target Access Side(s) | Source Location Solution | Target Location Solution | Reconfiguration Requirements |
|---|---|---|---|---|
| E-UTRAN, UTRAN PS | E-UTRAN, UTRAN PS | TS 23.271 | TS 23.271 | Either (a) Source side SGSN or MME sends a location report for handover with the UE identity, target side SGSN or MME identity to the source side GMLC and the serving LRF; Or (b) Target side SGSN or MME sends location report for handover with UE identity, its own identity and the serving LRF address to the target side GMLC which forwards the serving LRF based on the Serving LRF address. The serving LRF address is passed during the handover procedure from source serving node to target node. LRF replaces the source side GMLC with the target side GMLC if the GMLCs are different, and the source side serving node with the target side serving node if they are different. |
| E-UTRAN, UTRAN PS | E-UTRAN, UTRAN PS | TS 23.271 | OMA SUPL [38, 39] (Note 1) | (Note 3) Source side SGSN or MME sends a location report for handover with the UE identity, target side SGSN or MME identity to the source side GMLC and the serving LRF. Source side GMLC updates the serving LRF LRF replaces the source side GMLC with the target side E-SLP, and the source side serving node with null, indicate UP is supported at the target. LRF transfers the UE identity or address (e.g. IP address) to the target side E-SLP |
| E-UTRAN, UTRAN PS | E-UTRAN, UTRAN PS | OMA SUPL [38, 39] | TS 23.271 (Note 1) | (Note 3) UP is deployed together with SLg interface on the source side. Either (a) Source side SGSN or MME sends a location report for handover with the UE identity, target side SGSN or MME identity to the source side GMLC/E-SLP and the serving LRF. Or (b) Target side SGSN or MME sends location report for handover with UE identity, its own identity and the serving LRF address to the target side GMLC which forwards the serving LRF based on the Serving LRF address. The serving LRF address is passed during the handover procedure from source serving node to target serving node. LRF replaces the source side GMLC with the target side GMLC if the GMLCs are different, and the source side serving node with the target side serving node if they are different. Updated location will be retrieved via UP. |
| E-UTRAN, UTRAN PS | E-UTRAN, UTRAN PS | OMA SUPL [38, 39] | OMA SUPL [38, 39] | None identified |
| E-UTRAN | HRPD | TS 23.271 | OMA SUPL [38, 39] | (Note 3) Source side SGSN or MME sends a location report for handover with the UE identity, target side SGSN or MME identity to the source side GMLC and the serving LRF. Source side GMLC updates the |

-continued

| Source Access Side(s) | Target Access Side(s) | Source Location Solution | Target Location Solution | Reconfiguration Requirements |
|---|---|---|---|---|
| E-UTRAN, UTRAN PS | UTRAN CS GERAN CS | TS 23.271 | TS 23.271 | LRF<br>LRF replaces the source side GMLC with the target side E-SLP, and the source side serving node with null, indicate UP is supported at the target. LRF transfers the UE identity or address (e.g. IP address) to the target side E-SLP<br>Either (a) Source side SGSN or MME sends a location report for handover with the UE identity, target side SGSN or MME identity to the source side GMLC and the serving LRF.<br>Or (b) Target side SGSN or MME sends location report for handover with UE identity, its own identity and the serving LRF address to the target side GMLC which forwards the serving LRF based on the Serving LRF address. The serving LRF address is passed during the handover procedure from source serving node to target serving node.<br>LRF replaces the source side GMLC with the target side GMLC if the GMLCs are different, and the source side serving node with the target side serving node if they are different. |
| E-UTRAN, UTRAN PS | UTRAN CS GERAN CS | OMA SUPL [38, 39] | TS 23.271 | (Note 3)<br>OMA SUPL is deployed together with SLg interface.<br>Either (a) Source side SGSN or MME sends a location report for handover with the UE identity, target side SGSN or MME identity to the source side GMLC/E-SLP and the serving LRF.<br>Or (b) Target side SGSN or MME sends location report for handover with UE identity, its own identity and the serving LRF address to the target side GMLC which forwards the serving LRF based on the Serving LRF address. The serving LRF address is passed during the handover procedure from source serving node to target serving node.<br>LRF replaces the source side GMLC with the target side GMLC if the GMLCs are different, and the source side serving node with the target side serving node if they are different.<br>Updated location will be retrieved via UP. |
| E-UTRAN | 1xRTT | TS 23.271 | J-STD-036B [44] (Note 2) | Either (a) Source side SGSN or MME sends a location report for handover with the UE identity, target side 1xRTT MSC identity to the source side GMLC and the serving LRF.<br>Or (b) Target side 1xRTT MSC sends location report for handover with UE identity, its own identity and the serving LRF address to the target side GMLC/MPC which forwards the serving LRF based on the Serving LRF address. The serving LRF address is passed during the handover procedure from source serving node to target |

| Source Access Side(s) | Target Access Side(s) | Source Location Solution | Target Location Solution | Reconfiguration Requirements |
|---|---|---|---|---|
| | | | | serving node. LRF replaces the source side GMLC with the target side GMLC/MPC if they are different, and the source side serving node with the target side serving node if they are different. Source side GMLC or Target side updates the LRF (Note 2) LRF replaces the source side GMLC with location support on the target side (Note 2) |
| E-UTRAN | 1xRTT | OMA SUPL [38, 39] | J-STD-036B [44] (Note 2) | (Note 3) OMA SUPL is deployed together with SLg interface. Either (a) Source side SGSN or MME sends a location report for handover with the UE identity, target side 1xRTT MSC identity to the source side GMLC/E-SLP and the serving LRF. Or (b) Target side 1xRTT MSC sends location report for handover with UE identity, its own identity and the serving LRF address to the target side GMLC/MPC which forwards the serving LRF based on the Serving LRF address. The serving LRF address is passed during the handover procedure from source serving node to target serving node. LRF replaces the source side GMLC with the target side GMLC/MPC if they are different, and the source side serving node with the target side serving node if they are different. Updated location will be retrieved via UP. The target side updates the LRF (Note 2) The LRF replaces the source side E-SLP with location support on the target side (Note 2) |

It is to be noted that the present invention applies equally to a location solution for an intra E-UTRAN or intra UTRAN PS handover, as well as for an inter-RAT handover.

Figure 2:
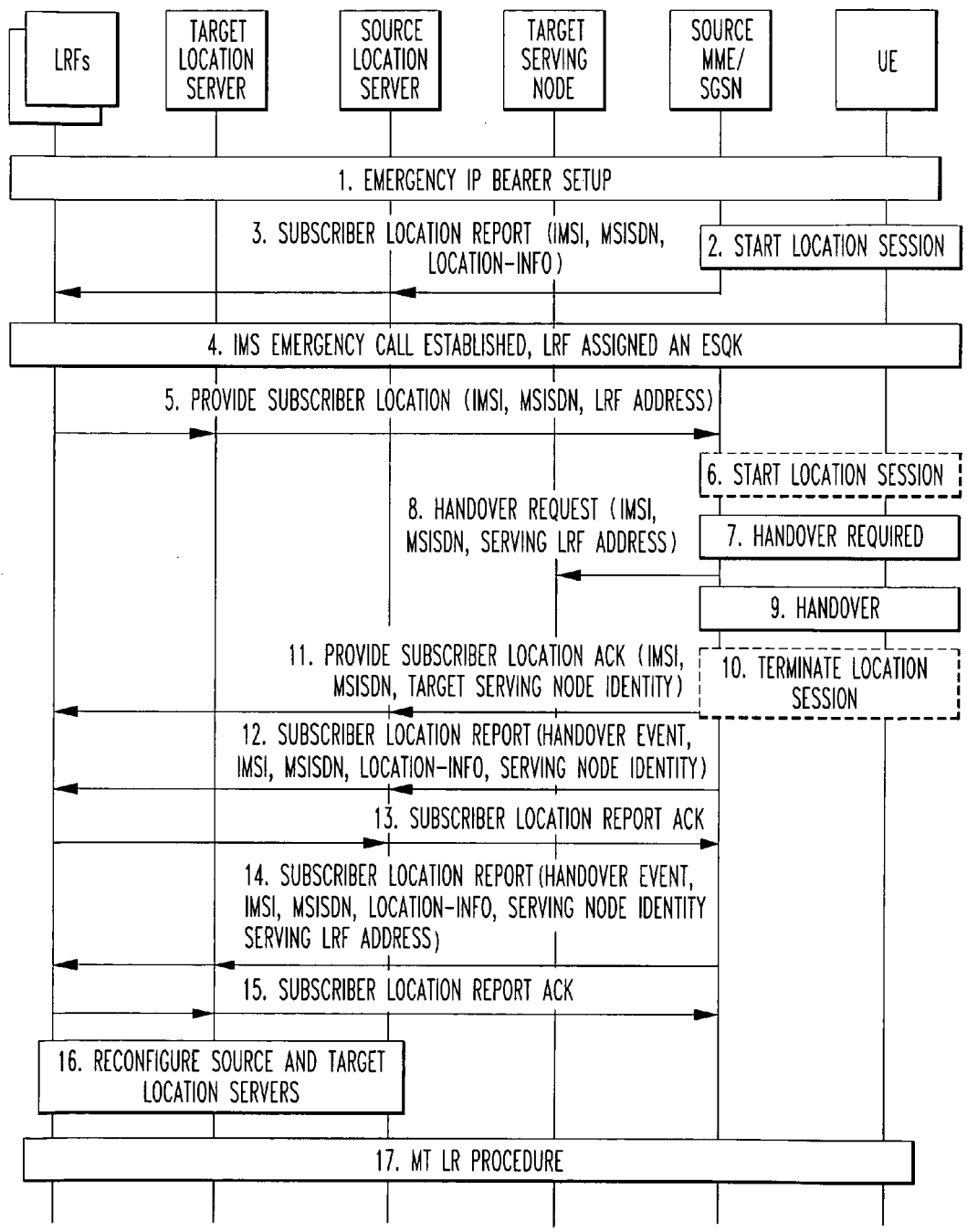
FIG. 2 shows messaging between network elements supporting location continuity for handover of an IMS emergency call, in accordance with the principles of the present invention.

FIG. 2 shows messaging between network elements supporting location continuity for handover of an IMS emergency call, in accordance with the principles of the present invention.

In particular, as shown in step 1 of FIG. 2, following the request for an emergency call, the UE establishes an emergency PDN connection for E-UTRAN access as defined in TS 23.401[42] or an emergency PDP context for UTRAN PS access as defined in TS 23.060 [15].

In step 2, as part of an emergency location service procedure, an NI-LR location session is initiated at the radio access network.

In step 3, the serving MME or SGSN (hereafter referred to as the source SGSN or MME) sends a Subscriber Location Report with UE identity(ies), emergency event indicator, serving cell identity, serving node identity and location estimates to the GMLC that it is associated by configuration. The GMLC determines the serving LRF based on the serving cell identity and forwards the Subscriber Location Report to the serving LRF.

In step 4, the UE may then establish an IMS emergency call as defined in TS 23.167[36a] during which an LRF is determined based on the serving cell identity.

In step 5, at some later time, the serving MME or SGSN (hereafter referred to as the source SGSN or MME) may receive a request from an associated GMLC (hereafter referred to as the source GMLC) for the location of the UE using the location solution defined in accordance with this invention is used on the source access side requested by the serving LRF. The request contains the UE identity, serving LRF address and other information elements.

In step 6, if updated location is required in the location request received in step 5, a location session starts at the radio access network. If step 2 occurs or if support for an NI-LR is required, the source SGSN or MME starts a location session with the serving RNC or an E-SMLC, in each case respectively, to obtain the location of the UE.

In step 7, a request is later sent to the source SGSN or MME from the serving eNodeB (for E-UTRAN access) or serving RNC (for UTRAN access) for a handover to a particular target eNodeB (for handover to E-UTRAN) or target RNC (for handover to UTRAN PS) or target MSC server (for handover to UTRAN CS or GERAN CS) or target cell associated with a particular 1xRTT MSC (for handover to 1xRTT) or HRPD target cell (for handover to HRPD).

In step 8, for handover to E-UTRAN, UTRAN PS, UTRAN CS or GERAN CS, the source MME or SGSN sends a Handover Request message to the target MME, SGSN, MSC server or MSC server (hereafter referred to as the target serving node) in each case respectively as defined in technical specification (TS) 23.401[42], TS 23.060 [15] or TS 23.216 [41]. For handover from E-UTRAN to 1xRTT, the source MME sends a Handover Request message to a target 1xRTT IWS as described in TS 23.216[41]. The Handover Request includes the serving LRF address if it is known to the source MME or SGSN. For handover from E-UTRAN to HRPD, this step does not occur.

In step 9, the rest of the handover preparation and execution procedure is completed as defined in TS 23.401[42], TS 23.402[43], TS 23.060 [15] or TS 23.216[41].

In step 10, the location session started in step 3 may terminate normally before step 9 is complete. If not, the source SGSN or MME shall abort the session once step 9 is complete. This may lead to the provision of a location estimate for the UE to the source SGSN or MME.

In step 11, if the location solution defined in accordance with this invention is used on the source side and step 6 occurred, the source SGSN or MME returns a Provide Subscriber Location response to the source GMLC carrying any location estimate obtained previously for the UE. Depending on configuration information in the source SGSN or MME (e.g., which may be related to the source and target serving node identities, the location capabilities of the UE and whether the UE is roaming or not), the Provide Subscriber Location response may convey the identity of the target serving node.

In step 12, if the location solution defined in accordance with this invention is used on the source side but steps 6 and 11 do not occur, the source SGSN or MME may depending on configuration information in the source SGSN or MME (e.g. as in step 11), send a Subscriber Location Report to the GMLC associated with the source SGSN or MME, carrying the UE identity (IMSI, MSISDN and/or IMEI), and an event type indicating handover and the identity of the target serving node.

In step 13, the source GMLC acknowledges the message in step 12 if this occurs.

In step 14, depending upon configuration information in the target serving node (e.g., which may be related to the source and target serving node identities, the location capabilities of the UE and whether the UE is roaming or not), the target serving node may send a Subscriber Location Report to a GMLC after handover in step 9 is complete if the location solution defined in accordance with this invention will be used on the target side. The Subscriber Location Report carries the UE's identity (IMSI, MSISDN and/or IMEI), an event type indicating handover, the identity of the target serving node, and the serving LRF's address. The target serving node may determine the address of the target GMLC from configuration information. As the serving LRF address is received, the target GMLC forwards the message to the serving LRF identified by the serving LRF address.

In step 15, the serving LRF returns an acknowledgement of the message in step 14 to the target GMLC, which forwards the acknowledgement to the target serving node.

In step 16, reconfiguration of the LRF and the source and target location servers may occur as summarized in the above table, which may involve removal of a source location server, assignment of a new target location server and/or updating of information in the LRF.

In step 17, if the LRF needs an updated location estimate for the UE after handover has occurred. The LRF may instigate an MT-LR request via the target GMLC if the location solution defined in accordance with this invention will be used on the target side. This will involve a repetition of step 5 on the target side if the location solution defined in accordance with this invention is used. Steps 5 to 16 may also be repeated on the target side to support a further handover if the previous handover was to either E-UTRAN or UTRAN PS.

It will be evident to those of ordinary skill in the art that the present invention can be easily enhanced for future needs, e.g., for IMS emergency handover from CS to PS.

While the invention has been described with reference to the exemplary embodiments thereof, those skilled in the art will be able to make various modifications to the described embodiments of the invention without departing from the true spirit and scope of the invention.

What is claimed is:

1. A method of providing location continuity during handover of an emergency call, comprising:
   receiving a request to handover control of an initiated Internet Protocol (IP) Multimedia Subsystem (IMS) emergency call from a user wireless device;
   suspending until a handover completes, a request for location information associated with said user wireless device received during said handover; and
   forwarding an identity of a serving location retrieval function (LRF) assigned to said IMS emergency call in a handover request from a source server in a first emergency services network to a target server in a second emergency services network; said identity of said serving location retrieval function (LRF) being selected from among a set of potential location retrieval functions (LRFs) in a multiple location retrieval function network.

2. The method of providing location continuity during handover of an emergency call according to claim 1, wherein: said LRF identity is at least one of an emergency services routing key (ESRK) and an emergency services query key (ESQK), and is passed from a 4G network to a 3G network.

3. The method of providing location continuity during handover of an emergency call according to claim 1, wherein: said LRF identity is at least one of an emergency services routing key (ESRK) and an emergency services query key (ESQK), and is passed from a 4G network to a 2G network.

4. The method of providing location continuity during handover of an emergency call according to claim 1, wherein: said user wireless device is a Global System for Mobile Communications (GSM) wireless phone.

5. The method of providing location continuity during handover of an emergency call according to claim 1, wherein: said first emergency services network is a packet switched (PS) network.

6. The method of providing location continuity during handover of an emergency call according to claim 1, wherein: said second emergency services network is a circuit switched (CS) network.

7. The method of providing location continuity during handover of an emergency call according to claim 1, wherein: said second emergency services network is a packet switched (PS) network.

8. The method of providing location continuity during handover of an emergency call according to claim 1, wherein: said LRF identity is an address of said serving LRF, and is passed from a 4G network to a 2G network.

9. The method of providing location continuity during handover of an emergency call according to claim 1, wherein: said LRF identity is an address of said serving LRF, and is passed from a 4G network to a 3G network.

* * * * *